US010825058B1

(12) United States Patent
Knas (10) Patent No.: US 10,825,058 B1
(45) Date of Patent: Nov. 3, 2020

(54) SYSTEMS AND METHODS FOR PRESENTING AND MODIFYING INTERACTIVE CONTENT

(71) Applicant: MASSACHUSETTS MUTUAL LIFE INSURANCE COMPANY, Springfield, MA (US)

(72) Inventor: Michal Knas, Monson, MA (US)

(73) Assignee: Massachusetts Mutual Life Insurance Company, Springfield, MA (US)

(*) Notice: Subject to any disclaimer, the term of this patent is extended or adjusted under 35 U.S.C. 154(b) by 779 days.

(21) Appl. No.: 15/282,454

(22) Filed: Sep. 30, 2016

Related U.S. Application Data

(60) Provisional application No. 62/236,619, filed on Oct. 2, 2015.

(51) Int. Cl.
*G06Q 30/00* (2012.01)
*G06Q 30/02* (2012.01)
*G06F 3/01* (2006.01)
*G06F 40/42* (2020.01)
*G06Q 40/08* (2012.01)

(52) U.S. Cl.
CPC ......... *G06Q 30/0269* (2013.01); *G06F 3/013* (2013.01); *G06F 40/42* (2020.01); *G06Q 30/0251* (2013.01); *G06Q 30/0271* (2013.01); *G06Q 40/08* (2013.01)

(58) Field of Classification Search
CPC .... G06Q 30/0269; G06Q 40/08; G06F 40/42; G06F 3/013
See application file for complete search history.

(56) References Cited

U.S. PATENT DOCUMENTS

| 6,084,556 A * | 7/2000 | Zwern | G09B 21/008 345/158 |
| 6,577,329 B1 * | 6/2003 | Flickner | G06F 3/013 715/774 |
| 6,712,468 B1 * | 3/2004 | Edwards | G06F 3/013 351/209 |

(Continued)

FOREIGN PATENT DOCUMENTS

WO WO-2006110472 A2 * 10/2006 ............. G06Q 30/02

OTHER PUBLICATIONS

José R., Cardoso J.C.S. Opportunities and Challenges of Interactive Public Displays as an Advertising Medium. In: Müller J., Alt F., Michelis D. (eds) Pervasive Advertising. Human-Computer Interaction Series. Springer, London, 2011. (Year: 2011).*

(Continued)

*Primary Examiner* — Luis A Brown
(74) *Attorney, Agent, or Firm* — Foley & Lardner LLP (57) ABSTRACT

Disclosed herein are systems and methods for presenting intelligent interactive content. The methods may include receiving user input on a first device from a first user to present content to a second user on a second device. The method may include providing the second device with content data, presenting the content to the second user, monitoring the second user's reaction to the content using eye-tracking sensor, and generating feedback data. The method may include providing the feedback data to the first device and presenting feedback to the first user.

20 Claims, 7 Drawing Sheets

(56) References Cited

U.S. PATENT DOCUMENTS

| | | | |
|---|---|---|---|
| 8,538,816 B2* | 9/2013 | Campbell | A61B 3/113 345/156 |
| 8,893,164 B1* | 11/2014 | Teller | H04N 21/4307 725/12 |
| 9,363,569 B1 | 6/2016 | Van Hoff et al. | |
| 10,013,532 B2 | 7/2018 | Mizuhara | |
| 10,359,842 B2 | 7/2019 | Mizuhara | |
| 2002/0104090 A1* | 8/2002 | Stettner | H04N 21/812 725/60 |
| 2003/0011743 A1* | 1/2003 | Povlotsky | G06K 9/00604 351/209 |
| 2003/0146901 A1* | 8/2003 | Ryan | G06K 9/3233 345/158 |
| 2004/0196433 A1* | 10/2004 | Durnell | G06K 9/00604 351/209 |
| 2005/0108092 A1* | 5/2005 | Campbell | G06Q 30/0267 705/14.64 |
| 2006/0277308 A1* | 12/2006 | Morse | G06Q 30/0259 709/227 |
| 2007/0050253 A1* | 3/2007 | Biggs | G06Q 30/02 705/14.67 |
| 2007/0164990 A1* | 7/2007 | Bjorklund | G06F 3/013 345/156 |
| 2008/0010117 A1* | 1/2008 | Oliveira | G06Q 30/02 705/26.1 |
| 2008/0033797 A1* | 2/2008 | Chickering | G06Q 30/0256 705/14.54 |
| 2008/0147488 A1* | 6/2008 | Tunick | G06Q 30/0273 705/7.29 |
| 2009/0112621 A1* | 4/2009 | Jung | G06F 19/328 705/2 |
| 2009/0118593 A1* | 5/2009 | Jung | G06Q 30/02 600/300 |
| 2009/0119154 A1* | 5/2009 | Jung | G06Q 30/02 705/7.33 |
| 2009/0132275 A1* | 5/2009 | Jung | G06Q 50/22 705/2 |
| 2009/0146775 A1* | 6/2009 | Bonnaud | G06F 9/453 340/3.1 |
| 2009/0248661 A1* | 10/2009 | Bilenko | G06F 16/951 |
| 2010/0245563 A1 | 9/2010 | Golovchinsky et al. | |
| 2011/0082755 A1* | 4/2011 | Itzhak | G06Q 30/0273 705/14.69 |
| 2011/0214082 A1* | 9/2011 | Osterhout | G06F 1/1673 715/773 |
| 2012/0016733 A1* | 1/2012 | Belvin | G06Q 30/0242 705/14.41 |
| 2012/0105486 A1* | 5/2012 | Lankford | G06F 3/0481 345/661 |
| 2012/0146895 A1* | 6/2012 | Bjorklund | G06F 3/017 345/156 |
| 2012/0158502 A1* | 6/2012 | Chung | G06Q 30/0269 705/14.53 |
| 2012/0158519 A1* | 6/2012 | Edwards | G06Q 30/0272 705/14.68 |
| 2012/0158792 A1* | 6/2012 | MacLaurin | G06F 21/6245 707/802 |
| 2012/0159356 A1* | 6/2012 | Steelberg | G06Q 50/01 715/760 |
| 2012/0164613 A1* | 6/2012 | Jung | G06Q 50/22 434/236 |
| 2012/0209705 A1* | 8/2012 | Ramer | G06Q 30/0269 705/14.51 |
| 2012/0256967 A1* | 10/2012 | Baldwin | G06F 3/0485 345/684 |
| 2012/0290401 A1* | 11/2012 | Neven | G06K 9/00671 705/14.68 |
| 2013/0041751 A1* | 2/2013 | Park | G06Q 30/02 705/14.56 |
| 2013/0085678 A1* | 4/2013 | Jung | A61B 5/04842 702/19 |
| 2013/0097011 A1* | 4/2013 | Wang | G06Q 30/02 705/14.45 |
| 2013/0103624 A1 | 4/2013 | Thieberger | |
| 2013/0145304 A1* | 6/2013 | DeLuca | G06F 3/013 715/781 |
| 2013/0340005 A1* | 12/2013 | Kwan | H04N 21/4223 725/39 |
| 2013/0340006 A1* | 12/2013 | Kwan | H04N 21/64322 725/39 |
| 2013/0346075 A1* | 12/2013 | Felkai | G06T 11/60 704/235 |
| 2014/0120891 A1* | 5/2014 | Chen | G06F 3/0487 455/418 |
| 2014/0129351 A1* | 5/2014 | Ringdahl | G06Q 30/0275 705/14.71 |
| 2014/0129352 A1* | 5/2014 | Ringdahl | G06Q 30/0275 705/14.71 |
| 2014/0136337 A1* | 5/2014 | Ringdahl | G06Q 30/0273 705/14.71 |
| 2014/0274159 A1* | 9/2014 | Bernheim Brush | G06F 17/18 455/456.4 |
| 2014/0340334 A1 | 11/2014 | Cho | |
| 2015/0012358 A1* | 1/2015 | Almendras Riesco | G06Q 30/0259 705/14.57 |
| 2015/0061969 A1* | 3/2015 | Chi | G06F 3/013 345/2.3 |
| 2015/0082135 A1* | 3/2015 | Schlesinger | H04L 67/22 715/202 |
| 2015/0143246 A1* | 5/2015 | Wang | H04L 67/22 715/738 |
| 2015/0154445 A1* | 6/2015 | Biswas | G06K 9/00604 345/2.3 |
| 2015/0160931 A1* | 6/2015 | Glazer | G06F 9/452 717/109 |
| 2015/0169946 A1* | 6/2015 | Needleman | G06F 16/583 382/118 |
| 2015/0234457 A1* | 8/2015 | Kempinski | G06F 3/013 345/156 |
| 2015/0363071 A1* | 12/2015 | Devale | G06F 3/013 715/782 |
| 2016/0018888 A1* | 1/2016 | Buford | G06F 3/013 345/156 |
| 2016/0042226 A1* | 2/2016 | Cunico | G06K 9/00315 382/103 |
| 2016/0133221 A1 | 5/2016 | Peana et al. | |
| 2016/0248719 A1* | 8/2016 | Acharyya | H04L 51/14 |
| 2016/0328015 A1* | 11/2016 | Ha | G06K 9/00597 |
| 2016/0350806 A1* | 12/2016 | Lau | G06Q 30/0267 |
| 2016/0357253 A1* | 12/2016 | Abraham | G06F 40/169 |
| 2016/0364012 A1* | 12/2016 | Govezensky | G06K 9/00302 |

OTHER PUBLICATIONS

Notice of Allowance on U.S. Appl. No. 15/282,520 dated Aug. 24, 2020.

* cited by examiner

SYSTEMS AND METHODS FOR PRESENTING AND MODIFYING INTERACTIVE CONTENT

CROSS-REFERENCE TO RELATED APPLICATION

This application claims priority to U.S. Provisional Patent Application Ser. No. 62/236,619 filed on Oct. 2, 2015, which is hereby incorporated by reference in its entirety.

TECHNICAL FIELD

The present disclosure relates in general to systems and methods for dynamically presenting and modifying content, based on sensed movements.

BACKGROUND

Interactions with potential clients are of utmost importance to sales efforts. As such, numerous efforts are constantly undertaken to improve the tools at the disposal of salespeople. Examples of such tools include mobile tools for presenting, remote access to presentation materials, video-conferencing tools, and the like.

Though these and other efforts have attempted to provide better tools to salespeople, it is still left up to the experience of the individual salesperson to determine how to proceed with a sales presentation. Less experienced salespeople, then, may benefit less from the available sales tools than others who are more adept at using the available sales tools and gauging the potential client's reactions. This in turn may lead to sub-optimal sales when a significant part of a sales force is not as experienced as a company would desire.

When a salesperson is attempting to sell a product or service to a potential in a remote location, the salesperson cannot see how the potential client is reacting to the sales pitch. Even if the customer were sitting directly in front of the salesperson, the sales person likely could not determine where the potential client is focusing on a particular portion of a display. As a result, it is difficult to revise the sales pitch materials or sales pitch approach based on a remote potential client's reaction to the content. Accordingly, there is a continuing need to provide tools capable of improving salesperson and client interactions. For example there is a need for a tool capable of communicating with a server and monitoring the salesperson, sales presentation, and the client in order to guide the salesperson towards a better sales presentation.

SUMMARY

The systems and methods disclosed herein attempt to address the problems associated with the conventional sales approaches by providing a computer implemented method and system to provide feedback to a salesperson about a remotely-located client such that the electronic content displayed to the client or the salesperson can be modified, updated, or dynamically generated in response to the feedback.

Disclosed herein are systems and methods for presenting and modifying intelligent interactive content. The methods may include receiving user input on a first device from a first user to present content to a second user on a second device. The method may additionally include providing the second device with content data, presenting the content to the second user, monitoring the second user's reaction to the content, and generating feedback data. The method may further include providing the feedback data to the first device and presenting feedback to the first user.

In some embodiments, a first user interacting with a control device is presented with a series of options for presenting content via a user interface. The control device receives user input from the first user for displaying content on a content display device and provides content data to the content display device. The content display device receives the content data, processes the content data into content, and displays the content to a second user via a display. As the content is displayed, an eye-tracking sensor monitors the second user's gaze and provides behavior data to the content display device. The content display device processes the behavior data to generate feedback data and provides the feedback data to the control device. The control device receives the feedback data, generates feedback based on the feedback data, and presents the feedback to the first user via the user interface. The first user can then use the feedback to alter user input provided to the control device.

Disclosed here are methods for presenting intelligent interactive content, including the steps of receiving user input from a first user, sending content data to a content display device, presenting content to a second user, generating feedback data based on behavior data received from eye-tracking sensor, receiving feedback data and generating feedback based on the feedback data, and presenting feedback to the first user. In some embodiments, a control device receives user input from a first user interacting with the control device. The control device generates content data from the received user input and sends the content data to a content display device. The content display device produces content based on the content data, displays the content to the second user via a display, and generates feedback data based on behavior data associated with the second user that is received from eye-tracking sensor. The control device also receives the feedback data from the content display device, generates feedback based on the feedback data, and presents the feedback to the first user. The control device then determines if the first user interacting with the control device wishes to continue presenting content on a content display device. If so, the method receives further user input from the first user and repeats one or more of the aforementioned steps.

Disclosed herein are also methods of generating feedback data, including the steps of presenting content to a user, monitoring user behavior, generating behavior data, processing behavior data to generate feedback data, and providing feedback data to a control device. In some embodiments, a content display device presents content to a user. The content display device then monitors the behavior of the user being presented content and generates behavior data. The content display device proceeds to process behavior data to generate feedback data. The content display device then provides feedback data to the control device.

In one embodiment, a computer-implemented method comprises receiving, by a processing unit of a control device, input from a first user on a user interface of the control device; generating, by the processing unit of the control device, content data based on the input and configured for presentation on a content display device; transmitting, by the processing unit of the control device via a communications network, the content data to the content display device for display on the content display device; collecting, by the processing unit of the control device, behaviors of a second user sensed by a sensor of the content display device; generating, by the processing unit of the control device, feedback data based on the behavior of the second user sensed by the sensor of the content display device; and displaying, by the processing unit, the feedback data to the first user on the user interface of the control device.

In another embodiment, a system comprises a content display device; a sensor communicatively coupled to the content display device; a communication network; and a control device comprising a processing unit, the control device configured to receive input from a first user on a user interface of the control device, generate content data based on the input and configured for presentation on a content display device, transmit via a communications network the content data to the content display device for display on the content display device, collect behaviors of a second user sensed by the sensor coupled to the content display device, generate feedback data based on the behavior of the second user sensed by the sensor coupled to the content display device, and display the feedback data to the first user on the user interface of the control device.

In another embodiment, a computer-implemented method comprises collecting, by a processing unit of a control device, visual behavior of a second user sensed by a sensor of a content display device when the content display device is displaying first content data; generating, by the processing unit of the control device, feedback data based on the visual behavior of the second user sensed by the sensor of the content display device; displaying, by the processing unit, the feedback data to the first user on the user interface of the control device; receiving, by the processing unit of the control device, an input via the user interface of the control device based on the feedback data; generating, by the processing unit of the control device, second content data based on the input and configured for presentation on the content display device; and transmitting, by the processing unit of the control device via a communications network, the second content data to the content display device for display on the content display device.

In another embodiment, a computer-implemented method comprises collecting, by a processing unit of a control device, visual behavior of a second user sensed by a sensor of a content display device when the content display device is displaying first content data; generating, by the processing unit of the control device, feedback data based on the behavior of the second user sensed by the sensor of the content display device; automatically generating, by the processing unit of the control device, second content data based on the feedback data and configured for presentation on the content display device; and transmitting, by the processing unit of the control device via a communications network, the second content data to the content display device for display on the content display device.

In yet another embodiment, a computer-implemented method comprises collecting, by a processing unit of a control device, visual behavior of a second user sensed by a sensor of a content display device when the content display device is displaying first content data; generating, by the processing unit of the control device, feedback data based on the visual behavior of the second user sensed by the sensor of the content display device; displaying, by the processing unit, the feedback data to the first user on the user interface of the control device; receiving, by the processing unit of the control device, an input via the user interface of the control device based on the feedback data; generating, by the processing unit of the control device, second content data based on the input and configured for presentation on the content display device; and transmitting, by the processing unit of the control device via a communications network, the second content data to the content display device for display on the content display device.

In still yet another embodiment, a computer-implemented method comprises collecting, by a processing unit of a control device, visual behavior of a second user sensed by a sensor of a content display device when the content display device is displaying first content data; generating, by the processing unit of the control device, feedback data based on the behavior of the second user sensed by the sensor of the content display device; automatically generating, by the processing unit of the control device, second content data based on the feedback data and configured for presentation on the content display device; and transmitting, by the processing unit of the control device via a communications network, the second content data to the content display device for display on the content display device.

Numerous other aspects, features and benefits of the present disclosure may be made apparent from the following detailed description taken together with the drawing figures.

BRIEF DESCRIPTION OF THE DRAWINGS

The present disclosure is here described with reference to embodiments illustrated in the drawings. Other embodiments may be used and/or other changes may be made without departing from the spirit or scope of the present disclosure. The illustrative embodiments described in the brief description are not meant to be limiting of the subject matter presented here.

DETAILED DESCRIPTION

The present disclosure is described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Systems and methods for presenting and/or modifying intelligent interactive content are disclosed. The methods may include receiving user input on a first device from a first user to present content to a second user on a second device. The method may include providing the second device with content data, presenting the content to the second user, monitoring the second user's reaction to the content, and generating feedback data. The method may include providing the feedback data to the first device and presenting the feedback to the first user. The method may also include receiving user input on the first device from the first user to present different content to the second user on the second display device based on the feedback data.

The disclosed methods may be implemented by users in interaction with computer systems. In one or more embodiments, the computer systems may include a control device and a content device including an eye-tracking sensor, where the computing devices may communicate using any network infrastructure. Examples of computing devices may include personal computers, tablet devices, and mobile phones, amongst others. Examples of network infrastructures may include intranets, local area networks (LAN), virtual private networks (VPN), wireless area networks (WAN) and the world wide web, amongst others.

Figure 1:
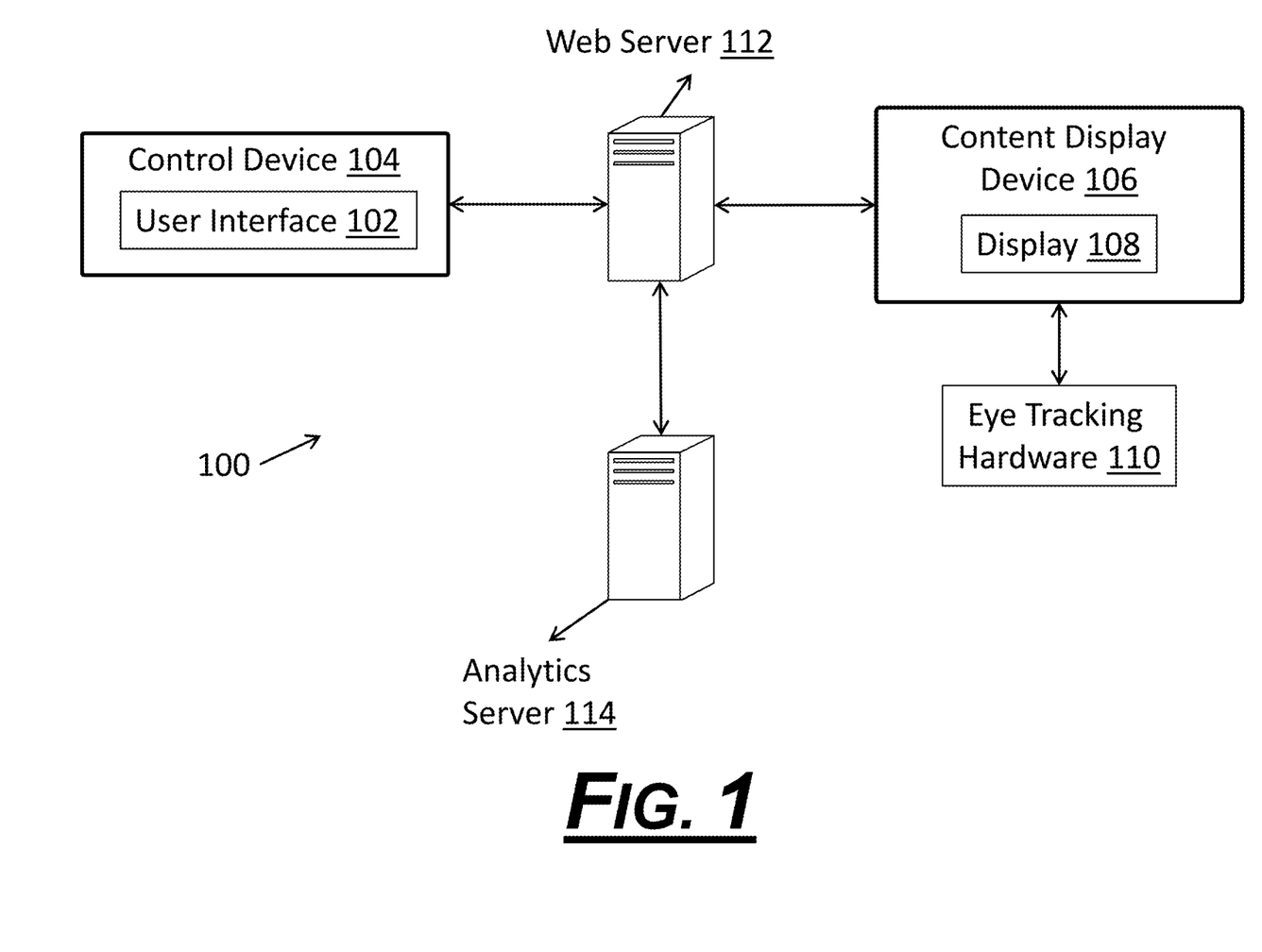
FIG. 1 illustrates a functional block diagram of a system architecture for presenting interactive content, according to an exemplary embodiment.

FIG. 1 is a functional block diagram illustrating a system architecture for presenting interactive content, according to an embodiment. In FIG. 1, system architecture 100 includes user interface 102, control device 104, content display device 106, display 108, and eye-tracking sensor 110. The control device 104 is configured to present information and communicate, through a web server such as webserver 112 or other networks, to the content display device 106, which is located remotely from the control device 104 and not in view of the control device 104 or user of the control device 104, but the control device 104 can receive information about the visual behavior of the content display device 106 from the remote location. For example, the content display device 106 and the control device 104 may be in different rooms, different buildings, different cities, different states, or different countries.

Control device 104 and content display device communicate over a network with a web server 112. Web server 112 is communicatively coupled with an analytics server 114. Web server 112 is configured to receive transmissions from the control device 104 and the content display device 106. These transmissions can include instructions from the control device 104 or the content display device 106 that are intended for the analytics server 114. The web server is also configured to send transmissions to the control device 104 and content display device 106. These transmissions can include data, information, or messages from the analytics server 114 to be rendered, displayed, or presented on the control device 104 or content display device 106.

The analytics server 114 is configured to receive input from the control device 104 and generate content for display on the content display device 106 based upon the received input. The analytics server 114 can retrieve data and content from a third-party or other database (not shown for clarity). The analytics server 114 can collect visual behavior from a sensor (e.g., eye tracking hardware 110) communicatively coupled with the content display device 106. The analytics server 114 can generate feedback data based on the visual behavior sensed by the sensor of the content display device 106.

The analytics server 114 can analyze the feedback data in view of the content displayed on the content display device 106. In a first example, the analytics server 114 can determine an area of focus. In one embodiment, the content displayed on the content display device 106 can be segmented or portioned based upon the pixels of the display. The segments can be a single pixel, or the segments can be more than one pixel for each segment. Each segment can be the same size or different sizes. The segments can also be based upon the particular content being displayed, whereby a particular frame or section of the display can be associated with that particular content (e.g., a graph, table, text, figure, chart, image, video). The analytics server 114 can determine whether the feedback data is concentrated on a particular pixel, a set of pixels, a section of the display, a frame of the display, or particular content on the display.

In a second example, the analytics server 114 can generate instructions to present overlay of feedback data on the content so that a first user of the control device 104 can visualize how a second user of the content display device 106 is observing the content shown on the content display device 106. In one embodiment, the analytics server 114 receives feedback data, presents an interface similar to the display presented on the content display device 106, presents a visual marker identification based on the feedback data that represents where the sensor determined that the second user observed the content on the content display device 106. The visual marker identification can be a set of dots, a line, a region, a polygon, a circle, or any other geometric configuration that indicates where the second user's eyes have been focused. The visual marker identification can be translucent, opaque, or any color.

In one embodiment of the second example, the analytics server 114 can process the feedback data and present the visual marker identification substantially in real-time. For example, as the second user of the content display device 106 is viewing content, the sensor is detecting the second user's reaction or view (e.g., eye tracking), and the analytics server 114 generate instructions to display the visual marker identification in substantially real time.

In another embodiment of the second example, the analytics server 114 can present substantially real-time feedback data on the control device 104 using visual marker identification. In this embodiment, the visual marker identification is only shown for a period of time showing the most recent feedback data. The period of time may be the last 2 seconds, 5 seconds, 10 seconds, 15 seconds, 20 seconds, 30 seconds, or any other time period. The visual marker identification can also generate instructions to change color or transparency on the display of the control device 104 as time progresses.

User interface 102 is coupled to and in bi-directional communication with control device 104 and control device 104 is coupled to and in bi-directional communication with content display device 106 via a suitable network infrastructure. Content display device 106 is coupled to and in bi-directional communication with display 108 and eye-tracking sensor 110. In some embodiments, system architecture 100 includes additional, fewer, or differently arranged components than those illustrated in FIG. 1.

In some embodiments, user interface 102 receives user input from a first user and provides the user input to control device 104. In these embodiments, user interface 102 is implemented as a graphical user interface (GUI) that allows the first user to interact with control device 104. In further embodiments, user interface 102 is implemented as a web interface, application interface, and the like. In some embodiments, user interface 102 is configured to provide the first user with series of options for presenting content. In an example, user interface 102 displays material related to insurance sales to an agent. In this example, user interface 102 allows an agent to select data points that are used to build illustrations, where the data may be derived from big data analytics, social media, and the like.

In some embodiments, control device 104 is implemented as a computing device configured to receive user input from a first user via user interface 102, process the user input to generate content data associated with one or more content display devices 106, provide the content data to each one or more content display devices 106, receive feedback data from the one or more content display devices 106, generate feedback based on the feedback data, and present the feedback to the first user via user interface 102. In an example, control device 104 receives user input via user interface 102, generates and provides content data to content display device 106, and receives feedback data from content display device 106. In this example, the user input includes instructions to display a desired set of content on content display device 106, instructions on how the desired set of content should be presented, and the like. Further to this example, the content data includes text, illustrations, videos, audio, interactive media, instructions for displaying media, and the like. In another example, the content data includes hyperlinks pointing to text, illustrations, videos, audio, interactive media, and the like. In yet another example, content data is transmitted using XML, JSON, and the like. In a further example, control device 104 receives feedback data from content display device 106, generates feedback based on the feedback data, and presents the feedback to a user via user interface 102. In this example, feedback is a graphical representation of one or more portions of feedback data, such as, for example graphical representations detailing interest in types of content, graphical representations comparing interest in different subjects or content, and the like.

In some embodiments, content display device 106 is implemented as a computing device configured to receive content data, process the content data to produce content and present the content to a second user, monitor the second user's behavior, generate feedback data based on the second user's behavior, and provide the feedback data to a control device for displaying to a first user. In an example, content display device 106 receives content data from control device 104, presents content based on the content data to the second user via display 108, monitors second user behavior using at least eye-tracking sensor 110, generates feedback data based on behavior data received from at least eye-tracking sensor 110, and provides the feedback data to control device 104. In another example, content display device 106 additionally receives interaction data from display 108 and uses the interaction data when generating feedback data. In further examples, content display device 106 monitors other indicators of user interest to generate feedback data, such as device input, audio cues, and the like. In some embodiments, feedback data includes information characterizing the interest of the second user in one or more portions of the content being displayed on display 108.

In some embodiments, display 108 is implemented as computer hardware including a processing unit for running related algorithms and computer executable program instructions to display content on one or more screens. In these embodiments, display 108 receives content from content display device 106 and displays content on one or more screens based on instructions contained within the received content. In other embodiments, display 108 generates interaction data from non-ocular interactions between a second user and hardware associated with display 108, such as, for example the second user touching a touchscreen, the second user providing auditory feedback, and the like. In these embodiments, interaction data includes data about non-ocular interactions between the second user and the content, such as, for example clicks made by the second user, touch gestures made by the second user, and the like. In an example, display 108 is implemented as one or more displays physically separate from content display device 106 (e.g., a monitor, television, personal computer, tablet computer, mobile phone, personal data assistant, smart watch, kiosk, signage, and the like). In another example, display 108 is a display incorporated into content display device 106 (e.g., the display on a mobile device, tablet computer, mobile phone, and the like).

In some embodiments, eye-tracking sensor 110 is implemented as computer hardware including a processing unit for running related algorithms and computer executable program instructions to generate behavior data. In these embodiments, eye-tracking sensor 110 monitors the point of gaze of a second user interacting with display 108 or the motion of a second user's eye relative to the second user's head. Data for eye movement can be collected by extracting information on eye position from video images using one or more devices, such as using one or more associated digital cameras. It must be noted that the eye-tracking sensor 110 may be implemented within or otherwise associated with the display device 106. In another embodiment, the eye-tracking sensor may be implemented in a separate device which communicates with the analytics server 114 or the control device 104.

Further to these embodiments, the eye-tracking sensor 110 determines whether the gaze of the second user is focused on display 108 and on which content portions of display 108 the second user focuses his/her attention on at different points in time. For example, data for eye movement can also be collected using a technique known as Pupil Centre Corneal Reflection (PCCR). PCCR uses a light source to illuminate the eye causing highly visible reflections, and a camera to capture an image of the eye showing these reflections. The image captured by the camera is then used to identify the reflection of the light source on the cornea (glint) and in the pupil. A vector formed by the angle between the cornea and pupil reflections—the direction of this vector, combined with other geometrical features of the reflections, can be used to calculate the gaze direction of the second user.

Further to this example, eye-tracking sensor 110 generates behavior data describing the gaze of the second user gaze and provides the behavior data to content display device 106. In an example, eye-tracking sensor 110 is implemented using a device such as the Eye Tribe® Tracker, a USB compatible eye tracker available from The Eye Tribe Aps (Copenhagen, DK) that is able to connect to Android™ devices. Further to this example, eye-tracking sensor 110 is implemented using a devices available from Tobii such as the Tobii X2-30 eye tracker, Tobii X2-60 eye tracker, Tobii TX300 eye tracker, Tobii T60 XL eye tracker, Tobii TX300 eye tracker, Tobii T60 and T120 eye tracker.

In one embodiment, the eye-tracking sensor 110, may use a regular light source or use an infrared light source in order to track visible ocular features of the second user's eyes. For example the eye-tracking sensor may track the direction or movement of pupil, limbus, or corneal reflections in order to determine the exact gaze area. Alternatively, the eye-tracking sensor 110 may track rotation of the eye and/or frequency of the pupil diameter change to calculate whether a second user is paying attention to the presented material. Furthermore, the eye-tracking sensor 110 may also track the light within the area surrounding the second user in order to track false-positive reading of the pupils. For example, pupil diameter change may be caused by a sudden change of surrounding light and not the second user's inattention or gazing away from the presented material.

Although the exemplary embodiment recites the use of eye tracking components, the system can utilize a facial recognition component in addition to or in the place of the eye tracking component. The facial recognition component can comprise a facial recognition computer program stored in the content display device or other networked device. Upon capturing an image, sequence, or video of a person, the facial recognition computer program can classify the expression of the person into one of a plurality of states, such as "interested," "not interested," "indifferent," and "confused." When the facial recognition computer program identifies the state, the facial recognition computer program can associate the state with a record associated with the content or a portion of the content being displayed on a display presented to the person. The facial recognition computer program can dynamically adjust the presentation of the content or can generate and transmit a message to a control device identifying a state or a changed state, similar to the use of eye tracking embodiments described herein. In one configuration, the facial recognition computer program can recognize the state of the person, generate and store a record associating the state of the person with the content of the record, and generate a message for transmission to the control device identifying the content that was associated with each state. This message can be transmitted in real time, when a state changes, or on a periodic basis.

In another embodiment, the system can also utilize a natural language recognition program component in addition to or in the place of the eye tracking component or the facial recognition computer program. The natural language recognition program may comprise a tone analyzer and detect a person's tone when conversing or responding to the presented content of the record. The tone analyzer may analyze words spoken by the first user and compare them against a receptiveness scale. For example, the tone analyzer may recognize certain words as angry, cheerful, open, or tentative and calculate an overall emotional state of the second user. In another embodiment, the natural language recognition program may also determine an emotional state for the second user by gauging speed and volume of the words spoken by the second user. In one configuration, the natural language recognition program can recognize the state of the second user, generate and store a record associating the state of the second user with the content of the record, and generate a message for transmission to the control device identifying the content that was associated with each state.

In operation, a first user interacting with control device 104 is presented with a series of options for presenting content via user interface 102. Control device 104 receives user input from the first user for displaying content on content display device 106, and provides content data to content display device 106. Content display device 106 receives the content data, processes the content data, and displays content to a second user via display 108. As the content is displayed, eye-tracking sensor 110 monitors the second user's gaze and provides behavior data to content display device 106. Content display device 106 then processes the behavior data to generate feedback data and provides the feedback data to control device 104. Control device 104 receives the feedback data, generates feedback using the feedback data, and presents the feedback to the first user via user interface 102. The first user can then use the feedback to alter user input provided to control device 104. In an example the control device can automatically alter user input provided to the control device 104.

Figure 2:
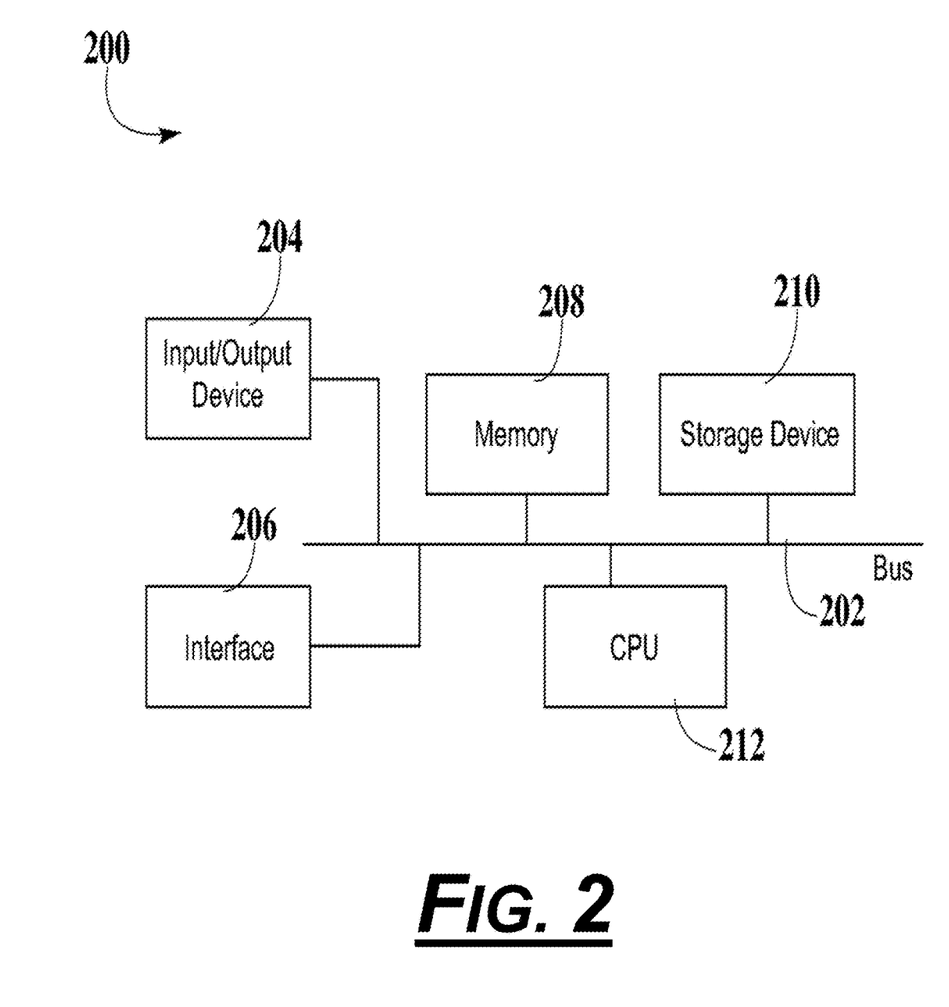
FIG. 2 illustrates a computing device, according to an exemplary embodiment.

FIG. 2 is an exemplary computing device 200 in which one or more embodiments of the present disclosure may operate, according to an embodiment. In some embodiments, computing device 200 includes bus 202, input/output (I/O) device 204, communication interface 206, memory 208, storage device 210 and central processing unit 212. In other embodiments, computing device 200 includes additional, fewer, different, or differently arranged components than those illustrated in FIG. 2. The analytics server can be configured as a specially programmed implementation of the computing device 200.

In FIG. 2, bus 202 is in physical communication with (I/O) device 204, communication interface 206, memory 208, storage device 210, and central processing unit 212. Bus 202 includes a path that permits components within computing device 200 to communicate with each other. Examples of (I/O) device 204 include peripherals and/or other mechanisms that may enable a user to input information to computing device 200, including keyboards, computer mice, buttons, touch screens, voice recognition software and hardware, biometric mechanisms, and the like. (I/O) device 204 also includes one or more mechanisms that output information to the user of computing device 200, such as, for example displays, light emitting diodes (LEDs), printers, speakers, and the like.

Examples of communication interface 206 include mechanisms that enable computing device 200 to communicate with other computing devices and/or systems through network connections. Examples of network connections include connections between computers, such as, for example intranets, local area networks (LANs), virtual private networks (VPNs), wide area networks (WANs), the Internet, and the like. Examples of memory 208 include random access memory 208 (RAM), read-only memory (ROM), flash memory, and the like. Examples of storage device 210 include magnetic and/or optical recording media, ferro-electric RAM (F-RAM) hard disks, solid-state drives, floppy disks, optical discs, and the like. In some embodiments, memory 208 and storage device 210 store information and instructions for execution by central processing unit 212. In other embodiments, central processing unit 212 includes a microprocessor, an application specific integrated circuit (ASIC), a field programmable object array (FPOA), and/or the like. In these embodiments, central processing unit 212 interprets and executes instructions retrieved from memory 208 and storage device 210.

According to some aspects of these embodiments, computing device 200 is implemented as control device 104, content display device 106, and the like. Examples of these implementations include servers, authorized computing devices, smartphones, desktop computers, laptop computers, tablet computers, mobile phones, PDAs, kiosks, signage, any other type of processor-controlled device that may receive, process, transmit digital data, and the like. Additionally, computing device 200 may perform certain operations that are required for the proper operation of system architecture 100. Suitable computing devices 200 may perform these operations in response to central processing unit 212 executing software instructions contained in a computer-readable medium, such as memory 208. The computing device 200 may include an implementation of application programming interfaces (APIs) in the form of some libraries to interface to a particular programming language or associated hardware that can communicate with a particular embedded system.

In some embodiments, the software instructions of system are read into memory 208 from another memory location, such as storage device 210, or from another computing device 200 (e.g., control device 104, content display device 106, and the like) via communication interface 206. In these embodiments, the software instructions contained within memory 208 instruct central processing unit 212 to perform processes that will be described in FIGS. 3-5, below. Alternatively, hardwired circuitry may be used in place of or in combination with software instructions to implement processes described herein. Thus, implementations described herein are not limited to any specific combination of hardware circuitry and software.

Figure 3:
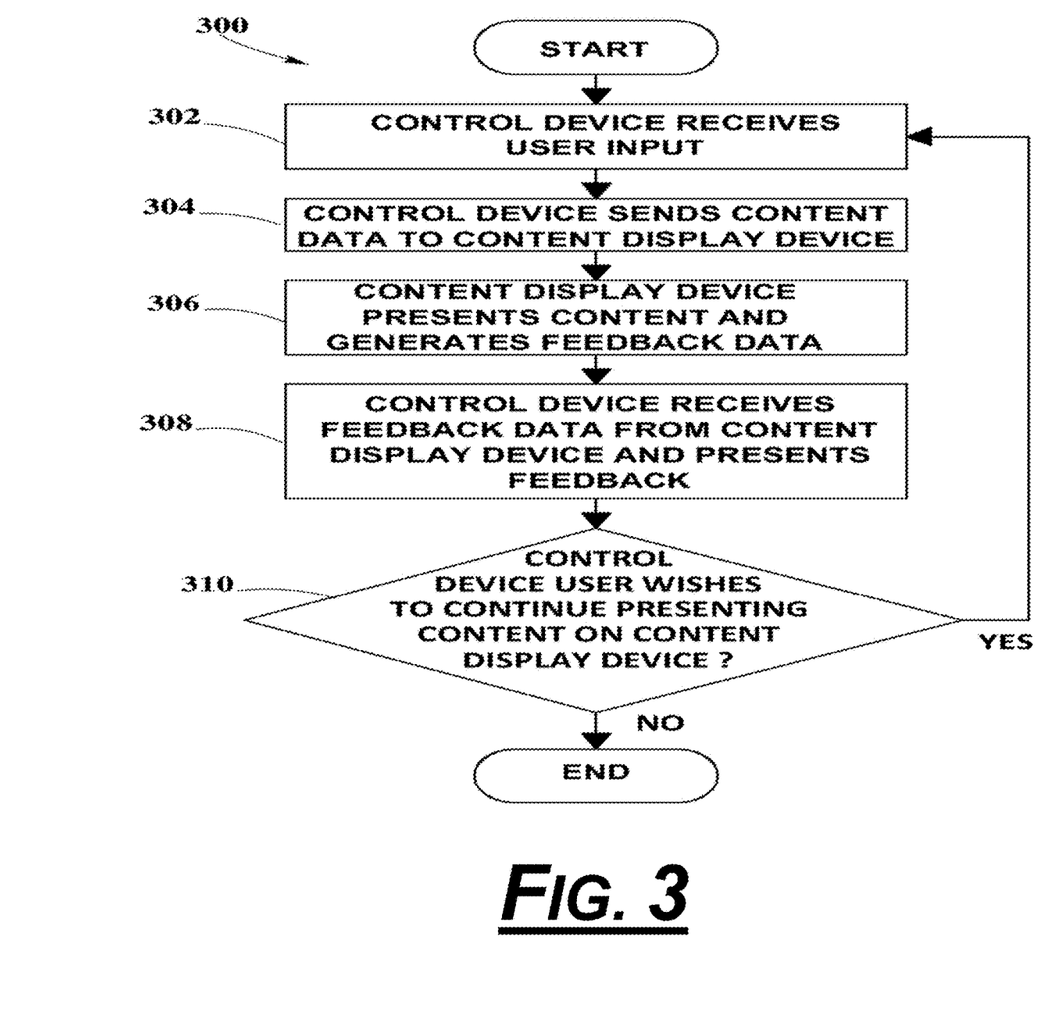
FIG. 3 illustrates a flowchart of a method of providing intelligent interactive content, according to an exemplary embodiment.

FIG. 3 is a flowchart illustrating an exemplary method of providing intelligent interactive content, according to an embodiment. In some embodiments, method 300 includes additional or fewer steps than those depicted in FIG. 3. In these embodiments, one or more steps may be performed in parallel or in a sequence different from that depicted in FIG. 3. In FIG. 3, method 300 begins with step 302, when a control device receives user input from a first user interacting with the control device and generates content data. In some embodiments, the user input is received after the first user interacts with a user interface in communication with the control device. In an example the control device receives user input from the first user interacting with the user interface and may generates content data based on the user input. In this example, the user input includes instructions to display a selection of content to a second user interacting with the content display device. In some embodiments, the selection of content includes insurance product recommendations derived from big data analytics. Method 300 advances to step 304. It must be appreciated that, in an embodiment, the control device's generation of the content data is controlled by the analytics server. For example, the analytics server may receive the user input data from the control device, analyze the data, generate content data, and transmit said data, using the web server or other networks, to the control device.

At step 304, the control device sends content data to a content display device. In an example the control device transmits content data to the content display device. In this example, content data may include text, images, and other media to be displayed by the content display device on the display of the content display device. In some embodiments, content data includes instructions, from the analytics server, for specific methods of displaying content on a screen, including positioning, size, visual emphasis, and the like. In these embodiments, content and instructions for displaying the content are communicated using XML, JSON, HTML, and the like. In other embodiments, content data includes references to content hosted on a web server. Examples of such references include Uniform Resource Locators (URLs), web addresses, and the like. It must be appreciated that, in an embodiment, the content device's transmission of the content data is controlled by the analytics server. For example, the analytics server may generate instruction and transmit said instruction to the control device to transmit content data to the content display device. In another embodiment, the analytics server may directly transmit the content data to the content display device using variety of methods including using the web server or other networks.

At step 306, the analytics server may generate instructions to the content display device to display content to the second user and generate feedback data. In some embodiments, the content display device displays content to the second user via a display and monitors the reaction of the second user to the content via the eye-tracking sensor. In other embodiments, the content display device monitors the reaction of the second user using the display. In this example, the eye-tracking sensor transmits behavior data to the content display device, and the content display device generates feedback data using the behavior data and transmits the feedback data to the analytics server. In another example, the content display device additionally receives interaction data from the display and uses the interaction data when generating feedback data. In some embodiments, feedback data includes scores associated with one or more portions of content being displayed by the content display device on the display. In other embodiments, feedback data includes social based information. Other methods of use in generating feedback data are discussed in FIG. 4. It must be appreciated that, in an embodiment, the content device, its display and the eye tracking sensor are all controlled by the analytics server.

At step 308, the control device receives feedback data from the content display device and receives instruction from the analytics server to present feedback to the first user. The control device receives feedback data from the content display device, processes the feedback data into feedback presents the feedback to the first user via the user interface of the control device. In some embodiments, feedback data includes scores associated with the second user's interest in one or more portions of content presented by the content display device. In an example, the control device presents an insurance agent with feedback associated with insurance related content presented to a potential client via the content display device. In this example, the feedback data indicates that the potential client is likely most interested in disability income insurance and the control device renders a prompt via user the control device user interface informing the insurance agent of the potential client's interest. It must be appreciated that the feedback data, in an embodiment, may be partially or wholly generated by the analytics server.

At decision step 310, the control device transmits data to the analytics server to determine if the first user interacting with the control device wishes to continue presenting content on a content display device. In an example the analytics server determines whether the first user wishes to continue presenting content on the content display device by instructing the control device to render a prompt on the control device user interface. If the first user wishes to continue, method 300 returns to step 302. If the first user does not wish to continue, method 300 ends. In other embodiments, method 300 ends at any point where the first user wishes to end displaying content, or any point at which the second user no longer wishes to interact with content being displayed.

Figure 4:
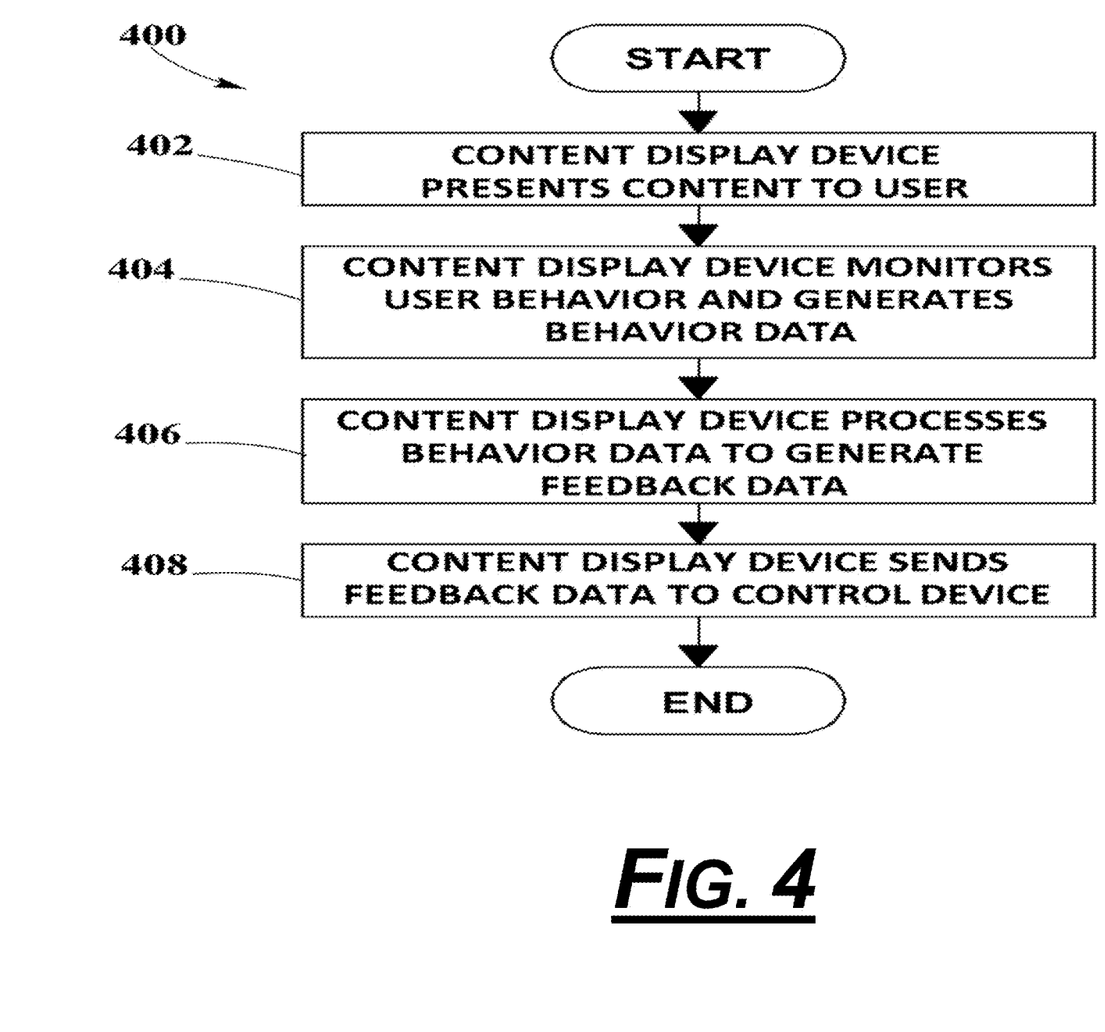
FIG. 4 illustrates a flowchart of a method of generating feedback data for the intelligent interactive content, according to an exemplary embodiment.

FIG. 4 is a flowchart illustrating an exemplary method of generating feedback data for the intelligent interactive content, according to an embodiment. In some embodiments, method 400 includes additional or fewer steps than those depicted in FIG. 4. In these embodiments, one or more steps may be performed in parallel or in a sequence different from that depicted in FIG. 4. In FIG. 4, method 400 begins with step 402, when a content display device presents, or is instructed by the analytics server to present, content to a user. In an example, the content display device displays content on the content display device display associated with content data received from the control device. In this example, one or more portions of the content are each associated with a geometric area on a screen associated with the content display device display at a point in time. In some embodiments, content includes sales illustrations associated with one or more types of insurance products, text and illustrations associated with the demographics of potential insurance clients, and the like. In an example, content includes a sales illustration describing a health insurance plan, demographic information describing a potential client of the insurance plan, and the like.

At step 404, the content display device monitors, or is instructed by the analytics server to monitor, the behavior of the user being presented with content. In an example the content display device monitors the user via the eye-tracking sensor. In some embodiments, the eye-tracking sensor generates, or is instructed by the analytics server to generate, behavior data associated with the user and transmits the behavior data to the content display device. The behavior data may also be transmitted to the analytics server and transmitted, by the analytics server, to the content display device. The behavior data includes information about the movements of the user's eyes, the duration of the user's gaze within boundaries associated with one or more portions of contents, and the like. In another example, the content display device monitors non-ocular interactions between the user and content displayed on the display using hardware associated with the display, such as a touchscreen, computer mouse, and the like. In yet another example, the content display device additionally monitors, or is instructed by the analytics server to monitor, other aspects of the user's behavior when generating behavior data, including clicks on one or more portions of content, pointing to one or more portions of content, audio cues related to one or more portions of contents, facial expressions related to one or more portions of content, and the like. In this example, different types of monitoring can be implemented using hardware supplemental to the eye-tracking sensor and the content display device.

At step 406, the content display device or the analytics server process behavior data to generate feedback data. In some embodiments, the analytics server processes behavior data received from the eye-tracking sensor and generates feedback data based on the received behavior data. In other embodiments, the analytics server processes interaction data received from a display when generating the feedback data. In an example, the analytics server processes behavior data received from the eye-tracking sensor to generate feedback data. In this example, feedback data includes a rating associated with one or more portions of the content presented by the content display device. In another example, feedback data includes quantitative ratings for one or more sales illustrations presented to the user, where the ratings are correlated to the perceived level of engagement with the user. In yet another example, feedback data includes qualitative evaluations of perceived level of engagement of the user with the content (e.g. interested, not interested, indifferent, and the like). In further examples, the analytics server processes interaction data received from the display when generating feedback data. It must be appreciated that the content display device may process the data on its own wholly or partially in conjunction with the analytics server.

At step 408, the content display device provides feedback data, or instructed by the analytics server to transmit feedback, to the control device. In an example the content display device provides feedback data to the control device. In some embodiments, feedback data is provided to the control device using JSON, XML, HTML, and the like.

Figure 5:
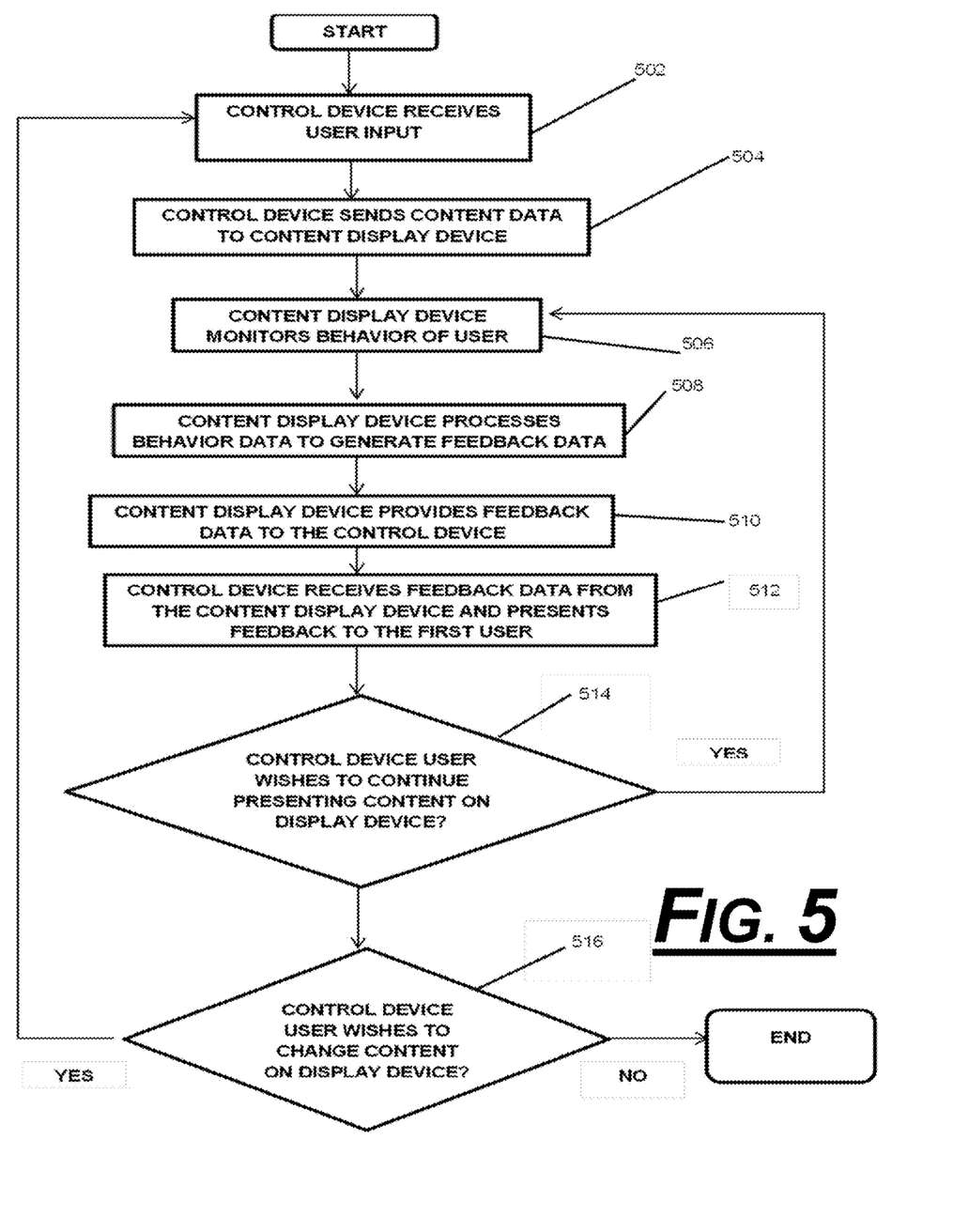
FIG. 5 illustrates a flowchart of a method of manipulating content for display based on feedback data, according to an exemplary embodiment.

FIG. 5 is a flowchart illustrating an exemplary method of manipulating and modifying the data for display on the content display device based on feedback data to the control device. In some embodiments, method 500 includes additional or fewer steps than those depicted in FIG. 5. In these embodiments, one or more steps may be performed in parallel or in a sequence different from that depicted in FIG. 5. In FIG. 5, method 500 begins with step 502, when the control device receives user input from a first user interacting with the control device and generates content data (e.g., is instructed by the analytics server to generate content data). In an example, the control device receives user input from the first user interacting with user interface and generates content data based on the user input. In this example, the user input includes instructions to display a selection of content to a second user interacting with the content display device. In some embodiments, the selection of content includes insurance product recommendations derived from big data analytics. A person skilled in the art will recognize that actions described within this figure may be wholly or partially conducted by the device (e.g., content display device or control device) in conjunctions with the analytics server. For example the analytics server may generate instructions for any of the devices described herein to collect or monitor data and analyze said data and generate and transmit instructions to the device to transmit the data to another device or the user.

At step 504, the control device sends content data to a content display device (e.g., is instructed by the analytics server to transmit the content data). In this example, content data includes text, images, and other media to be displayed by the content display device on the display. In some embodiments, content data includes instructions for specific methods of displaying content on a screen, including positioning, size, visual emphasis, and the like. In these embodiments, content and instructions for displaying the content are communicated using XML, JSON, HTML, and the like.

In another example, the content display device displays content, or is instructed to display content, on the display associated with content data received from the control device. In this example, one or more portions of the content are each associated with a geometric area on a screen associated with the display at a point in time. In some embodiments, content includes sales illustrations associated with one or more types of insurance products, text and illustrations associated with the demographics of potential insurance clients, and the like. In an example, content includes a sales illustration describing a health insurance plan, demographic information describing a potential client of the insurance plan, and the like.

At step 506, the content display device monitors the behavior of the user being presented with content using a sensor. In an example the content display device is instructed by the analytics server to monitor the user via the eye-tracking sensor. In some embodiments, the eye-tracking sensor generate behavior data associated with the user and provides the behavior data to the content display device. The behavior data includes information about the movements of the user's eyes, the duration of the user's gaze within boundaries associated with one or more portions of contents, and the like. In another example, the content display device monitors non-ocular interactions between the user and content displayed on the display using hardware associated with the display, such as a touchscreen, computer mouse, and the like. In yet another example, the content display device additionally monitors other aspects of the user's behavior when generating behavior data, including clicks on one or more portions of content, pointing to one or more portions of content, audio cues related to one or more portions of contents, facial expressions related to one or more portions of content, and the like. In this example, different types of monitoring can be implemented using hardware supplemental to the eye-tracking sensor and the content display device.

At step 508, the content display device processes behavior data to generate feedback data. In some embodiments, a content display device processes behavior data received from eye-tracking sensor and generates feedback data based on the received behavior data. In other embodiments, a content display device processes interaction data received from a display when generating the feedback data. In an example, the content display device processes behavior data received from the eye-tracking sensor to generate feedback data. It must be mentioned that the processing the interaction may also be done by the analytics server. In this example, feedback data includes a rating associated with one or more portions of the content presented by the content display device. In another example, feedback data includes quantitative ratings for one or more sales illustrations presented to the user, where the ratings are correlated to the perceived level of engagement with the user. In yet another example, feedback data includes qualitative evaluations of perceived level of engagement of the user with the content (e.g. interested, not interested, indifferent, and the like). In further examples, the content display device processes interaction data received from the display when generating feedback data.

At step 510, the content display device provides feedback data to the control device. In an example the content display device provides feedback data to control device (e.g., is instructed by the analytics server to transmit the data to the control device). In some embodiments, feedback data is provided to the control device using JSON, XML, HTML, and the like.

At step 512, the control device receives feedback data from the content display device and presents feedback to the first user. In an example the control device receives feedback data from the content display device, processes the feedback data into feedback and presents the feedback to the first user via the user interface. It must be mentioned that processing the feedback data may also be performed by the analytics server. In some embodiments, feedback data includes scores associated with the second user's interest in one or more portions of content presented by the content display device. In an example, a the control device presents an insurance agent with feedback associated with insurance related content presented to a potential client via the content display device. In this example, the feedback data indicates that the potential client is likely most interested in disability income insurance and the control device renders a prompt via the user interface informing the insurance agent of the potential client's interest.

At decision step 514, the control device determines if the first user interacting with the control device wishes to continue presenting the same content on a content display device, change the content on the content display data or end the method 500. In an example, the control device automatically generates different content to display on the content display data based on the behavior of the second user sensed by the sensor of the content display device. In other embodiments, second user's behavior maybe analyzed and the content may be modified based on the content in view of other information regarding the second user. For example if the second user has not reacted towards a section within the display, then analytics server may determine that the second user is not responding to the content and change the content of that portion of the display.

In an example the control device determines whether the first user wishes to continue presenting content on the content display device, change the content on the display data or end the method 500 by rendering a prompt on the user interface. If the first user wishes to continue presenting the same content, method 500 returns to step 506. If the first user wishes to change the content, method 500 returns to step 502. If the first user does not wish to continue, method 500 ends. In other embodiments, method 500 ends at any point where the first user wishes to end displaying content, or any point at which the second user no longer wishes to interact with content being displayed.

Figure 6:
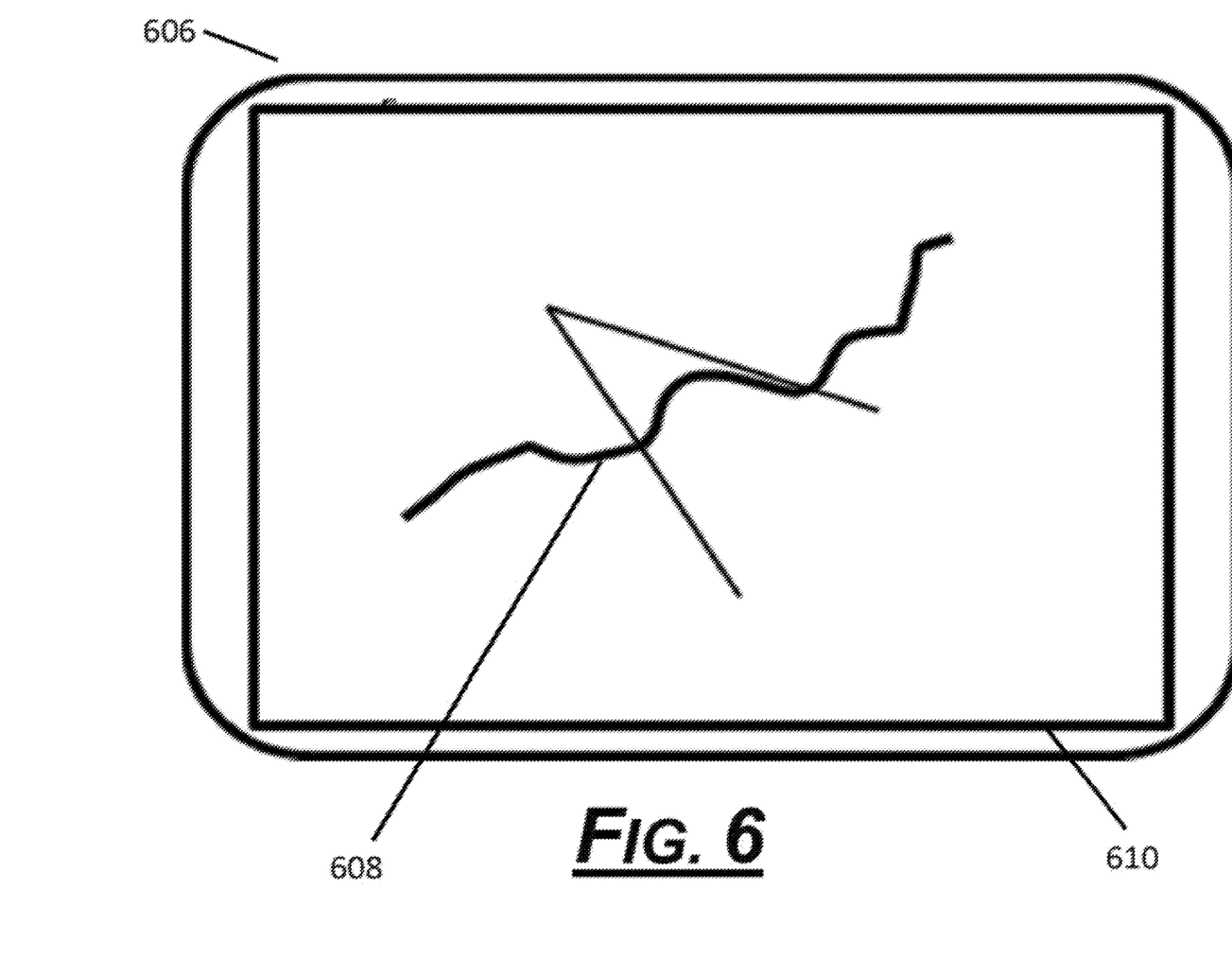
FIG. 6 illustrates a content display device, according to an exemplary embodiment.

FIG. 6 depicts and embodiment of a content display device such as content display device 606 which is implemented as a computing device configured to receive content data, process the content data to produce content and present the content 608 to a second user, monitor the second user's behavior, generate feedback data based on the second user's behavior, and provide the feedback data to the control device for displaying to a first user. In an example, display 610 is a display incorporated into a content display device 606 (e.g. the display on a mobile device, tablet, and the like).

In an example, content display device 606 receives content data from the control device, presents content 608 based on the content data to the second user via display 610, monitors second user behavior using at least the eye-tracking sensor, generates feedback data based on behavior data received from at least the eye-tracking sensor, and provides the feedback data to the control device. In another example, content display device 606 additionally receives interaction data from display 610 and uses the interaction data when generating feedback data. In further examples, content display device 606 monitors other indicators of user interest to generate feedback data, such as device input, audio cues, and the like. In some embodiments, feedback data includes information characterizing the interest of the second user in one or more portions of the content being displayed on display 610.

In some embodiments, display 610 is implemented as a computer hardware including a processing unit for running related algorithms and computer executable program instructions to display content on one or more screens or communication with a server such as the analytics server. In these embodiments, display 610 receives content 608 from the content display device and displays content 608 based on instructions contained within the received content. In other embodiments, display 610 generates interaction data from non-ocular interactions between a second user and hardware associated with display 610, such as, for example the second user touching a touchscreen, the second user providing auditory feedback, and the like. In these embodiments, interaction data includes data about non-ocular interactions between the second user and the content, such as, for example clicks made by the second user, touch gestures made by the second user, and the like.

In some embodiments, the eye-tracking sensor is implemented as computer hardware including a processing unit for running related algorithms and computer executable program instructions to generate behavior data. In these embodiments, the eye-tracking sensor monitors the point of gaze of a second user interacting with the display or the motion of a second user's eye relative to the second user's head. Data for eye movement can be collected by extracting information on eye position from video images using one or more devices such as, for example using one or more associated digital cameras. It must be appreciated that, in an embodiment, the content display device 606 is controlled by the analytics server. For example, the analytics server may generate and transmit instructions, using the web server or other networks, to content display device 606 to monitor second user behavior.

Figure 7A:
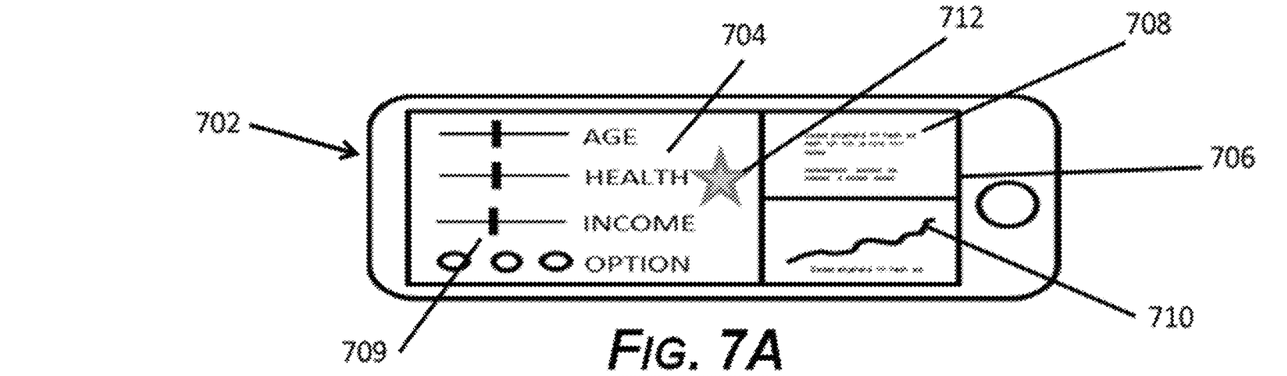
FIG. 7A illustrates a control device, according to an exemplary embodiment.
Figure 7B:
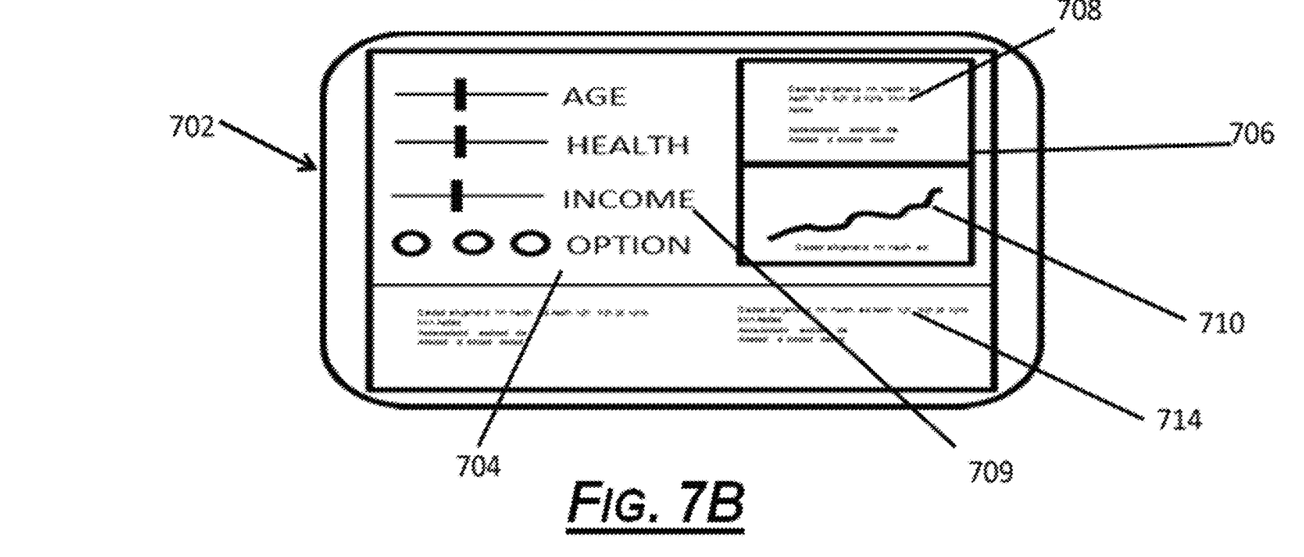
FIG. 7B illustrates a control device, according to an exemplary embodiment.

FIGS. 7A and 7B each illustrates embodiments of a control device 702 that includes user interface 704 and a display 706 incorporated into control device 702. In an example of FIG. 7A the display 706 is on a mobile device.

In an example of FIG. 7B, the display 706 is on a tablet. User interface 704 is coupled to and in bi-directional communication with control device 702 and control device 702 is coupled to and in bi-directional communication with the content display device via a suitable network infrastructure. The content display device is coupled to and in bi-directional communication with the display and the eye-tracking sensor. In some embodiments, user interface 704 receives user input from a first user and provides the user input to control device 702. In these embodiments, user interface 704 is implemented as a graphical user interface (GUI) that allows the first user to interact with control device 702. In further embodiments, user interface 704 is implemented as a web interface, application interface, and the like. In some embodiments, user interface 704 is configured to provide the first user with series of options for presenting content. In an example, user interface 704 displays material 708 related to insurance sales to an agent. In this example, user interface 704 allows an agent to select data points from the material 708 that are used to build illustrations 709, where the data 708 may be derived from big data analytics, Social Media, and the like.

In some embodiments, control device 702 is implemented as a computing device configured to receive user input from a first user via user interface 704, process the user input to generate content data associated with one or more the content display devices, provide the content data to each one or more content display devices, receive feedback data from the one or more content display devices, generate feedback 710 based on the feedback data, and present the feedback 710 to the first user via user interface 704. In an example, control device 702 receives user input via user interface 704, generates and provides content data to the content display device, and receives feedback data from the content display device. In this example, the user input includes instructions to display a desired set of content on the content display device, instructions on how the desired set of content should be presented, and the like. Further to this example, the content data includes text, illustrations, videos, audio, interactive media, instructions for displaying media, and the like. In another example, the content data includes hyperlinks pointing to text, illustrations, videos, audio, interactive media, and the like. In yet another example, content data is transmitted using XML, JSON, and the like. In a further example, control device 702 receives feedback data from the content display device, generates feedback 710 based on the feedback data, and presents the feedback 710 to a user via user interface 704. In this example, feedback 710 is a graphical representation of one or more portions of feedback data, such as, for example graphical representations detailing interest in types of content, graphical representations comparing interest in different subjects or content, graphical representations showing the client view with eye tracking points, and the like.

In an example, the feedback data indicates that the second user is likely most interested in a particular set of the content data, e.g. health insurance or disability income insurance and control device 702 renders a prompt 712 via user interface 704 informing the first user of the second user's interest. In an example, the prompt 712 allows the decision to be made if control device wishes to continue presenting the same content on a content display device, change the content on the content display data or further interact with the second user, by for example asking the second user questions related to the second user's interest.

In an example, the control device 702 can present additional data 714 suitable to compare the second user to other users. In a further example, the additional data 714 can be social based information, health information or the like. It must be appreciated that, in an embodiment, the control device 702 is controlled by the analytics server. For example, the analytics server may generate and transmit instructions, using the web server or other networks, to the control device 702 to present (e.g., transmit) additional data 714.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
generating and transmitting a first instruction, by a server to a sensor associated with a content display device, to collect visual behavior associated with a second user, wherein the content display device is displaying first content data to the second user, the first content data comprising a plurality of display segments, each display segment displaying at least a portion of the first content data, wherein the content display device comprises a graphical user interface;
upon receiving the visual behavior of the second user, generating by the server, feedback data based on the visual behavior of the second user and further based on non-ocular interaction of the second user with the graphical user interface at the content display device displaying the first content data;
determining, by the server, a relationship between the feedback data and the first content data displayed on the content display device, the relationship indicating which display segment within the plurality of display segments is being viewed by the second user and the non-ocular interaction of the second user with the graphical user interface, and a score for each display segment based on the relationship between the feedback data and the first content data;
generating and transmitting, by the server to a control device, a second instruction to display a visual identifier to a first user on a user interface associated with a control device, wherein the visual identifier is based on the feedback data and wherein the control device is located remotely from the content display device;
receiving, by the server, an input via the user interface associated with the control device based on the feedback data;
generating and transmitting, by the server to the content display device, a third instruction to display second content data based on the input and configured for presentation on the content display device, wherein the second content data comprises content that is different from information displayed in one or more of the plurality of display segments having the score less than a predetermined threshold.

2. The method according to claim 1, wherein the sensor associated with the content display device is an eye-tracking sensor communicatively coupled to the content display device.

3. The method according to claim 1, wherein the feedback data comprises information characterizing the interest of the second user in one or more portions of the first content data displayed on the content display device as interested, not interested, or indifferent.

4. The method according to claim 1, wherein the feedback data is a graphical representation of one or more portions of the feedback data.

5. The method according to claim 1, wherein the first content, second content or both comprises instructions to display at least one of insurance product recommendations derived from big data analytics, sales illustrations for an insurance product, text associated with the demographics of a potential client for the insurance product, or images associated with the demographics of a potential client for the insurance product.

6. The method according to claim 1, wherein the first content, second content, or both comprises instructions to display the content data including at least one of an instruction for position on the content display device, content data size or visual emphasis of content data.

7. The method according to claim 1, wherein the relationship between the feedback data and the first content data includes a duration of the second user viewing each display segment.

8. The method according to claim 2, wherein the eye-tracking sensor extracts information about the second user's eye movement and duration of the second users gaze within a boundary associated with one or more portion of content.

9. The method according to claim 1, wherein the interaction of the second user with the graphical user interface at the content display device displaying the first content data is selected from the group consisting of one or more clicks made by the second user, one or more touch gestures made by the second user, touching a touchscreen of the content display device displaying the first content data, and one or more inputs to an interactive form of the first content data.

10. The method according to claim 1, wherein generating the feedback data is further based on voice recognition of the second user to analyze emotional state via one or more of tone analysis and natural language recognition.

11. A system comprising:
a content display device having a display;
a control device having a display and being located remotely from the content display device;
a sensor communicatively coupled to the content display device;
a communication network; and
an analytics server comprising a processing unit, the analytics server configured to:

generate and transmit a first instruction to the sensor communicatively coupled to the content display device, to collect visual behavior associated with a second user, wherein the content display device is displaying first content data to the second user, wherein the first content data comprising a plurality of display segments, each display segment displaying at least a portion of the first content data, wherein the content display device comprises a graphical user interface;

upon receiving the visual behavior of the second user, generate feedback data based on the visual behavior of the second user and further based on non-ocular interaction of the second user with the graphical user interface at the content display device displaying the first content data;

determine a relationship between the feedback data and the first content data displayed on the content display device, the relationship indicating which display segment within the plurality of display segments is being viewed by the second user and the non-ocular interaction of the second user with the graphical user interface, and a score for each display segment based on the relationship between the feedback data and the first content data;

generate and transmit to a control device, a second instruction to display a visual identifier to a first user on a user interface associated with a control device, wherein the visual identifier is based on the feedback data;

receive an input via the user interface associated with the control device based on the feedback data;

generate and transmit to the content display device, a third instruction to display second content data based on the input and configured for presentation on the content display device, wherein the second content data comprises content that is different from information displayed in one or more of the plurality of display segments having the score less than a predetermined threshold.

12. The system according to claim 11, wherein the sensor communicatively coupled to the content display device is an eye-tracking sensor.

13. The system according to claim 11, wherein the feedback data comprises information characterizing the interest of the second user in one or more portions of the first content data displayed on the content display device as interested, not interested, or indifferent.

14. The system according to claim 11, where in the feedback data is a graphical representation of one or more portions of the feedback data.

15. The system according to claim 11, wherein the first content data, the second content data, or both comprises instructions to display at least one of insurance product recommendations derived from big data analytics, sales illustrations for an insurance product, text associated with the demographics of a potential client for the insurance product, or images associated with the demographics of a potential client for the insurance product.

16. The system according to claim 11, wherein the first content data, the second content data, or both comprises instructions to display the content data including at least one of an instruction for position on the content display device, content data size or visual emphasis of content data.

17. The system according to claim 11, wherein the relationship between the feedback data and the first content data includes a duration of the second user viewing each display segment.

18. The system according to claim 12, wherein the eye-tracking sensor extracts information about the second user's eye movement and duration of the second users gaze within a boundary associated with one or more portion of content.

19. The system according to claim 11, wherein generate the feedback data is further based on voice recognition of the second user to analyze emotional state via one or more of tone analysis and natural language recognition.

20. The system according to claim 11, wherein the interaction of the second user with the graphical user interface at the content display device displaying the first content data is selected from the group consisting of one or more clicks made by the second user, one or more touch gestures made by the second user, touching a touchscreen of the content display device displaying the first content data, and one or more inputs to an interactive form of the first content data.

* * * * *